United States Patent
Hayakawa et al.

(10) Patent No.: US 11,062,819 B2
(45) Date of Patent: Jul. 13, 2021

(54) CABLE AND HARNESS WITH LOW-MELTING PET FIBER TAPE

(71) Applicant: Hitachi Metals, Ltd., Tokyo (JP)

(72) Inventors: Yoshikazu Hayakawa, Tokyo (JP); Tomoyuki Murayama, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 16/687,407

(22) Filed: Nov. 18, 2019

(65) Prior Publication Data

US 2020/0168358 A1 May 28, 2020

(30) Foreign Application Priority Data

Nov. 26, 2018 (JP) .............................. JP2018-220055

(51) Int. Cl.
| | |
|---|---|
| *H01B 7/00* | (2006.01) |
| *H01B 7/18* | (2006.01) |
| *B60R 16/02* | (2006.01) |
| *H01B 3/44* | (2006.01) |
| *H01R 9/11* | (2006.01) |

(52) U.S. Cl.
CPC ....... *H01B 7/0045* (2013.01); *B60R 16/0215* (2013.01); *H01B 3/441* (2013.01); *H01B 7/187* (2013.01); *H01B 7/1875* (2013.01); *H01R 9/11* (2013.01)

(58) Field of Classification Search
None
See application file for complete search history.

(56) References Cited

U.S. PATENT DOCUMENTS

| | | | | |
|---|---|---|---|---|
| 3,742,084 A | * | 6/1973 | Olyphant, Jr. ........... | C08L 23/02 428/379 |
| 3,879,518 A | * | 4/1975 | Ney ......................... | H01B 3/24 264/171.16 |
| 3,983,313 A | * | 9/1976 | Ney ......................... | H01B 3/24 174/121 SR |
| 4,157,414 A | * | 6/1979 | Smith ...................... | C08K 5/01 428/324 |

(Continued)

FOREIGN PATENT DOCUMENTS

| | | |
|---|---|---|
| JP | S62-264504 A | 11/1987 |
| JP | 2000-2940048 A | 10/2000 |

(Continued)

OTHER PUBLICATIONS

JP5943170_Description_Translation. WIPO, https://patentscope.wipo.int/search/en/detail.jsf?docId=JP274516591&tab=NATCOL-LDOCUMENTS&_cid=P12-KBM650-21801-1 (Year: 2016).*

(Continued)

*Primary Examiner* — Timothy J. Dole
*Assistant Examiner* — Muhammed Azam
(74) *Attorney, Agent, or Firm* — McGinn I.P. Law Group, PLLC

(57) ABSTRACT

A cable is composed of a plurality of electric wires, a tape member provided over a periphery of the plurality of electric wires, and an outer sheath provided over an outer periphery of the tape member. The tape member includes a mixture of a first fiber having a melting point and a second fiber having a melting point lower than the melting point of the first fiber.

20 Claims, 3 Drawing Sheets

(56) References Cited

U.S. PATENT DOCUMENTS

| | | | | |
|---|---|---|---|---|
| 5,399,408 | A | * | 3/1995 | Nowara .................... B32B 3/26 428/73 |
| 5,630,002 | A | * | 5/1997 | Ota ...................... G02B 6/4408 385/104 |
| 6,329,465 | B1 | * | 12/2001 | Takahashi ........... C08L 23/0815 525/191 |
| 9,115,254 | B2 | * | 8/2015 | Sasamura ........... B29C 44/0461 |
| 9,165,697 | B2 | * | 10/2015 | Iwasaki ................. H01B 3/441 |
| 9,530,536 | B2 | * | 12/2016 | Fujimoto .............. H01B 3/441 |
| 9,566,639 | B2 | * | 2/2017 | Kohida ..................... B22F 3/24 |
| 9,799,424 | B2 | | 10/2017 | Heipel et al. |
| 9,953,746 | B2 | * | 4/2018 | Iwasaki ................. H01B 13/06 |
| 10,115,498 | B2 | | 10/2018 | Heipel et al. |
| 10,186,349 | B2 | * | 1/2019 | Iwasaki ................. H01B 7/295 |
| 2002/0045803 | A1 | * | 4/2002 | Abe ..................... A61B 1/0055 600/140 |
| 2003/0220543 | A1 | * | 11/2003 | Abe ..................... A61B 1/0055 600/140 |
| 2005/0020882 | A1 | * | 1/2005 | Hosoi .................... A61B 1/005 600/140 |
| 2006/0167158 | A1 | * | 7/2006 | Yagi ........................ C08L 23/06 524/436 |
| 2008/0190544 | A1 | * | 8/2008 | Hopf ......................... C09J 7/21 156/73.5 |
| 2009/0056230 | A1 | * | 3/2009 | Flendrig ................ B60J 5/0405 49/502 |
| 2011/0275268 | A1 | * | 11/2011 | Harris ................. H02G 3/0481 442/319 |
| 2013/0014988 | A1 | * | 1/2013 | Sato ........................ B60R 16/02 174/70 C |
| 2013/0020125 | A1 | * | 1/2013 | Murata ................ H02G 3/0487 174/72 A |
| 2013/0037321 | A1 | * | 2/2013 | Murata ............... B60R 16/0215 174/72 A |
| 2013/0075155 | A1 | * | 3/2013 | Kawai ................ B60R 16/0215 174/70 C |
| 2013/0161092 | A1 | * | 6/2013 | Kurita ................ B60R 16/0215 174/72 A |
| 2014/0033524 | A1 | * | 2/2014 | Sato ..................... H02G 3/0487 29/825 |
| 2014/0064669 | A1 | * | 3/2014 | Kachmar ............... G02B 6/443 385/78 |
| 2014/0102747 | A1 | * | 4/2014 | Mizuhira ................. H02G 3/32 174/68.3 |
| 2014/0124261 | A1 | * | 5/2014 | Mizuhira ............ B60R 16/0215 174/74 R |
| 2014/0131093 | A1 | * | 5/2014 | Sato ................... B60R 16/0215 174/70 R |
| 2014/0166358 | A1 | * | 6/2014 | Kajiwara ............. H02G 3/0406 174/72 A |
| 2015/0027623 | A1 | * | 1/2015 | Malloy ................. B32B 37/025 156/235 |
| 2015/0030812 | A1 | * | 1/2015 | Teal ........................ F16L 57/00 428/167 |
| 2015/0068802 | A1 | * | 3/2015 | Kajiwara ............. H02G 3/0487 174/72 A |
| 2015/0090474 | A1 | * | 4/2015 | Eshima ................ H02G 3/0481 174/107 |
| 2015/0217102 | A1 | * | 8/2015 | Bourgeois ............. B29C 48/156 604/500 |
| 2015/0222101 | A1 | * | 8/2015 | Kajiwara ............. B60R 16/0215 174/72 A |
| 2015/0235734 | A1 | * | 8/2015 | Takata ................. H01B 7/0216 442/389 |
| 2015/0321625 | A1 | * | 11/2015 | Sato ......................... H02G 3/04 174/72 A |
| 2016/0013625 | A1 | * | 1/2016 | Suzuki ............... B60R 16/0215 174/72 A |
| 2016/0039367 | A1 | * | 2/2016 | Yoshida .................. H01B 3/18 174/70 R |
| 2016/0141070 | A1 | | 5/2016 | Heipel et al. |
| 2016/0144805 | A1 | * | 5/2016 | Yamaguchi ............. B32B 5/028 181/207 |
| 2016/0211050 | A1 | * | 7/2016 | Matsumura ............... H01B 3/28 |
| 2016/0240282 | A1 | * | 8/2016 | Yamamoto ........... H01B 7/2825 |
| 2017/0169809 | A1 | * | 6/2017 | Takata ................ B60R 16/0207 |
| 2017/0229212 | A1 | * | 8/2017 | Hayakawa .......... B60R 16/0215 |
| 2017/0236617 | A1 | * | 8/2017 | Hayakawa ........... H01B 7/0241 174/72 A |
| 2017/0323702 | A1 | | 11/2017 | Heipel et al. |
| 2018/0022064 | A1 | * | 1/2018 | Takata ...................... B32B 5/26 181/284 |
| 2018/0166184 | A1 | * | 6/2018 | Hayakawa ........... H01B 7/1855 |
| 2018/0247733 | A1 | * | 8/2018 | Mann .................... H01B 11/12 |
| 2018/0358151 | A1 | * | 12/2018 | Mizuno .................... B32B 5/024 |
| 2019/0375925 | A1 | * | 12/2019 | Mohri .................... C08K 5/372 |
| 2019/0385764 | A1 | * | 12/2019 | Hayakawa ........... H01B 7/0045 |

FOREIGN PATENT DOCUMENTS

| | | | | |
|---|---|---|---|---|
| JP | | 2013-235687 A | 11/2013 | |
| JP | | 5943170 B1 | * 6/2016 | ............ H01B 11/02 |
| JP | | 2017-147067 A | 8/2017 | |
| JP | | 6209284 B2 | 10/2017 | |
| JP | | 2018-098144 A | 6/2018 | |

OTHER PUBLICATIONS

Japanese Office Action dated Sep. 1, 2020, in corresponding Japanese Application No. 2018-220055, with an English translation thereof.

* cited by examiner

CABLE AND HARNESS WITH LOW-MELTING PET FIBER TAPE

CROSS-REFERENCE TO RELATED APPLICATIONS

The present invention is based on Japanese Patent Application No. 2018-220055 filed on Nov. 26, 2018, the entire contents of which are incorporated herein by reference.

BACKGROUND OF THE INVENTION

1. Field of the Invention

The present invention relates to a cable and a harness and in particular, to a cable and a harness to be wired from a vehicle body to a wheel.

2. Description of the Related Art

In recent years, for example, a composite cable to be used in wiring from a vehicle body to a wheel has been provided (see, e.g., Japanese Patent No. 6209284). The composite cable disclosed in Japanese Patent No. 6209284 is configured to include at least three conductors each having a respective conducting wire surrounded by a respective conductor sheath.

These at least three conductors are surrounded by a separating sleeve, which is then surrounded by a common sheath of an electrical lead wire. The separating sleeve is characterized by being made of a synthetic nonwoven fabric cloth or a plastic film. Further, the common sheath is characterized by being formed from a thermoplastic polyurethane elastomer.

[Patent Document 1] Japanese Patent No. 6209284

SUMMARY OF THE INVENTION

However, in the composite cable disclosed in Japanese Patent No. 6209284, it may be time consuming to remove the separating sleeve when an end portion of the composite cable is worked (terminated).

It is an object of the present invention to provide a cable and a harness that make it possible to save the time required to remove a separating sleeve (hereinafter also referred to as "tape member") when working (terminating) an end portion of the cable.

For the purpose of solving the above problems, the present invention provides cables defined by [1] to [7] below and a harness defined by [8] below.

[1] A cable (1), comprising: a plurality of electric wires (5, 6); a tape member (3) provided over a periphery of the plurality of electric wires (5, 6); and an outer sheath (4) provided over an outer periphery of the tape member (3), wherein the tape member (3) comprises a mixture of a first fiber having a melting point and a second fiber having a melting point lower than the melting point of the first fiber.
[2] The cable (1) according to [1] above, wherein the tape member (3) is adhered to an inner peripheral surface (4a) of the outer sheath (4) and made integral with the outer sheath (4).
[3] The cable (1) according to [1] or [2] above, wherein the melting point of the first fiber is higher than an extrusion molding temperature of the outer sheath (4), and the melting point of the second fiber is lower than the extrusion molding temperature of the outer sheath (4).
[4] The cable (1) according to [3] above, wherein the extrusion molding temperature of the outer sheath (4) is about 230 degrees, the melting point of the first fiber is about 250 degrees, and the melting point of the second fiber is about 220 degrees.
[5] The cable (1) according to any one of [1] to [4] above, wherein the first fiber includes a high melting point PET fiber, and the second fiber includes a low melting point PET fiber having a melting point lower than that of the high melting point PET fiber.
[6] The cable (1) according to any one of [1] to [5] above, wherein the first fiber and the second fiber are not longer than about 5 mm in length.
[7] The cable (1) according to any one of [1] to [6] above, wherein a percentage of the second fiber content is not lower than 10% by mass and not higher than 90% by mass.
[8] A harness (20), comprising: the cable (1) according to any one of [1] to [7] above, and a connector (21a, 21b) attached to an end portion of the plurality of electric wires (5, 6).

Points of the Invention

According to the present invention, it is possible to provide the cable and the harness that make it possible to save the time required to remove the tape member when working (terminating) the end portion of the cable.

DETAILED DESCRIPTION OF THE PREFERRED EMBODIMENTS

Embodiment

An embodiment of the present invention will be described with reference to the drawings. Note that, although the embodiment described below is intended to be shown as a suitable specific example in implementing the present invention, and contains some part specifically illustrating various technical matters that are technically preferable, the technical scope of the present invention is not to be construed as being limited to this specific aspect. In addition, the dimensions of each constituent element in each drawing are not necessarily being depicted with the same ratios as the ratios of the dimensions of each constituent element of the actual cable or harness.

(Description of a Vehicle to which the Cable is Applied)

Figure 1:
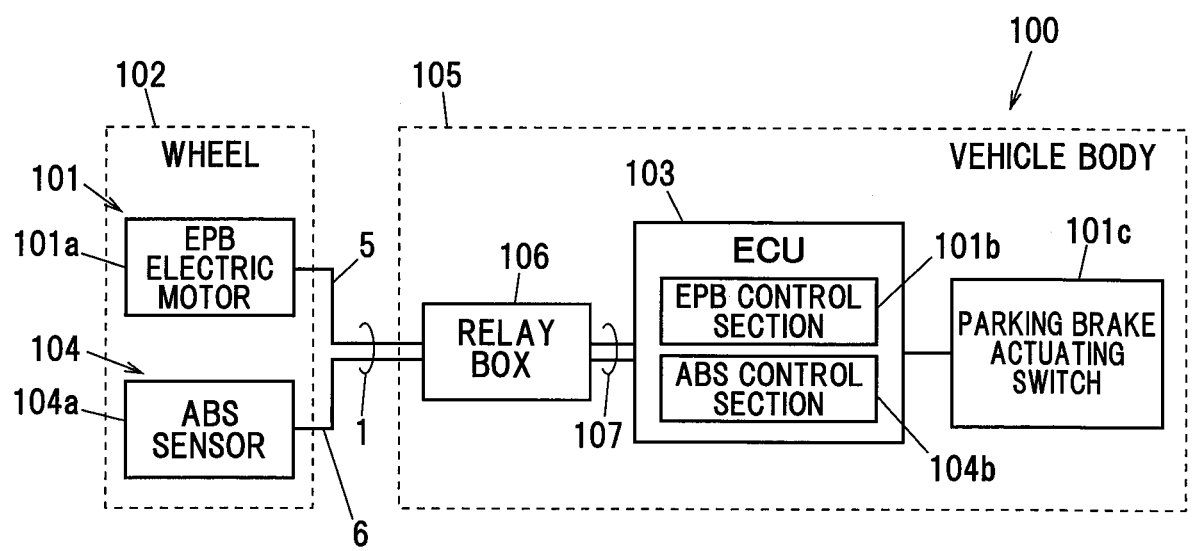
FIG. 1 is a block diagram showing one example of a configuration of a vehicle using a cable according to one embodiment of the present invention.

FIG. 1 is a block diagram showing a configuration of a vehicle using a cable according to the present embodiment. As shown in FIG. 1, the vehicle 100 is being configured to include an electric parking brake (hereinafter also referred to as "the EPB") 101 as an electric braking device. The EPB 101 is being configured to include an EPB electric motor 101a and an EPB control section 101b.

The EPB electric motor 101a is being mounted in a wheel 102 of the vehicle 100. The EPB control section 101b is being mounted in an ECU (electronic control unit) 103 of the vehicle 100. Note that the EPB control section 101b may be mounted in a control unit other than the ECU 103, or may be mounted in a dedicated hardware unit.

The EPB electric motor 101*a* is being configured in such a manner as to be provided with a piston (not shown) to which a brake pad (not shown) is attached, so that the piston is moved by rotational driving of the EPB electric motor 101*a*, to thereby press the brake pad against the disc rotor of the wheel 102, to generate a braking force. One pair of first electric wires 5 (see FIG. 2) are being connected to the EPB electric motor 101*a* as a power supply wire to supply a driving current to the EPB electric motor 101*a*.

When a parking brake actuating switch 101*c* is operated from an OFF state to an ON state to stop the vehicle 100, the EPB control section 101*b* is being configured in such a manner as to output the driving current to the EPB electric motor 101*a* for a predetermined time (e.g., 1 second), and thereby press the brake pad against the disc rotor of the wheel 102, to apply the braking force to the wheel 102.

Further, the EPB control section 101*b* is being configured in such a manner as to, when the parking brake actuating switch 101*c* is operated from an ON state to an OFF state, or when the accelerator pedal is depressed, output the driving current to the EPB electric motor 101*a*, and release the brake pad from the disk rotor of the wheel 102 to release the braking force from the wheel 102.

That is, the EPB 101 is being configured in such a manner that its actuation is maintained from when the parking brake actuating switch 101*c* is switched on until when the parking brake actuating switch 101*c* is switched off or until when the accelerator pedal is depressed. Note that the parking brake actuating switch 101*c* may be a lever type or a pedal type switch.

In addition, the vehicle 100 is being mounted with an ABS device 104. The ABS device 104 is being configured to include an ABS sensor 104*a* and an ABS control section 104*b*.

The ABS sensor 104*a* is being designed to detect the rotational speed of the wheel 102 during vehicle traveling, and is being mounted in the wheel 102. The ABS control section 104*b* is being designed to control the EPB 101 and control the braking force of the wheel 102 on the basis of the output of the ABS sensor 104*a* so that the wheel 102 is not locked in the event of a sudden vehicle stop, and the ABS control section 104*b* is being mounted in the ECU 103. Two second electric wires 6 (see FIG. 2) are being connected to the ABS sensor 104*a* as a signal wire.

Figure 2:
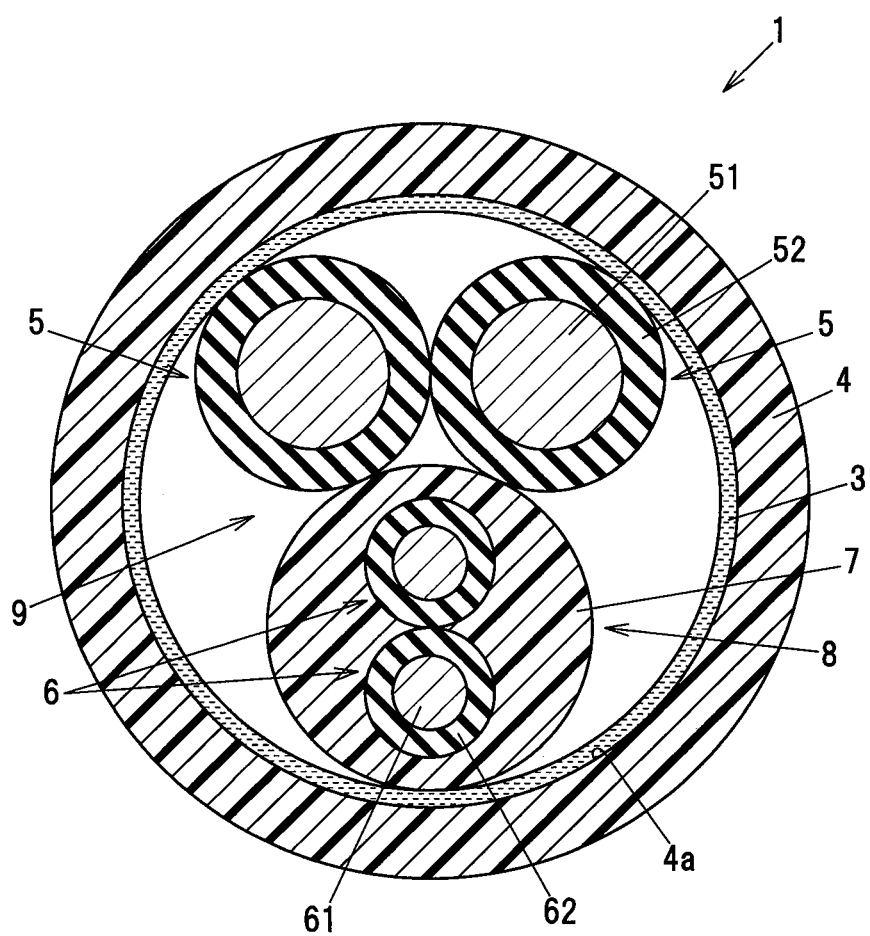
FIG. 2 is a transverse cross-sectional view showing one example of a configuration of a cable according to one embodiment of the present invention.

The cable 1 according to the present embodiment is the one produced by wrapping with a tape member 3 a periphery of the two first electric wires 5 and one multi-core electric wire 8 including the two second electric wires 6, and by covering them together with an outer sheath 4 (see FIG. 2). The cable 1 being extended from a wheel 102 side thereof is being connected to an electric wire group 107 within a relay box 106 provided in a vehicle body 105, and is being connected to the ECU 103 and a battery (not shown) via the electric wire group 107.

Although in FIG. 1, the only one wheel 102 is shown for simplicity of the drawing, the EPB electric motor 101*a* and the ABS sensor 104*a* may be mounted in each of the wheels 102 of the vehicle 100, or may be mounted in only front wheels or only rear wheels of the wheels 102 of the vehicle 100.

(Description of the Cable 1)

The cable 1 according to the present embodiment will be described with reference to FIG. 2. FIG. 2 is a transverse cross-sectional view showing one example of the configuration of the cable 1 according to the embodiment of the present invention. As shown in FIG. 2, the cable 1 is being configured to include the two first electric wires 5, the multi-core electric wire 8, which is being configured by covering with an inner sheath 7 a periphery of the one pair (two) of second electric wires 6 twisted together, the tape member 3, which is being provided over a periphery of an aggregate 9 formed by laying the two first electric wires 5 and the one multi-core electric wire 8 together, and the outer sheath 4 being provided over an outer periphery of the tape member 3.

Although herein, the configuration with the cable 1 including therein the three electric wires in total, i.e., the two first electric wires 5 and the one multi-core electric wire 8 with the two second electric wires 6 included therein, is described as an example, the number of electric wires is not limited to the three. Further, for example, when the cable 1 is configured to include a large number of electric wires, the cable 1 may have a multilayer lay configuration including therein an inner layer portion, which is formed by laying a plurality of ones of the electric wires together, and an outer layer portion, which is formed by winding a plurality of ones of the electric wires helically around a periphery of that inner layer portion.

[First Electric Wires 5]

In the present embodiment, the first electric wires 5 are used as a power supply wire to supply the driving current to the EPB electric motor 101*a* mounted in the wheel 102 of the vehicle 100. The first electric wires 5 are each constituted by coating a periphery of a respective first conductor 51 composed of highly conductive wires made of a copper or the like stranded together with a respective first insulating members 52 made of an insulating resin such as a cross-linked polyethylene or the like, for example.

As the wires to be used in the first conductors 51, it is possible to use the wires having a diameter of e.g. 0.05 mm or more and 0.30 mm or less. If the wires having a diameter of less than 0.05 mm are used, no sufficient mechanical strength can be obtained, which may lead to a lowering in the bending resistance, while if the wires having a diameter of greater than 0.30 mm are used, the cable 1 may be lowered in flexibility.

The outer diameters of the first conductors 51 and the thicknesses of the first insulating members 52 may appropriately be configured according to the magnitude of the required driving current. For example, considering that the first electric wires 5 are a power supply wire to supply the driving current to the EPB electric motor 101*a*, it is preferable to set the outer diameters of the first conductors 51 at 1.5 mm or more and 3.0 mm or less.

[Second Electric Wires 6]

In the present embodiment, the second electric wires 6 are used as a signal wire for the ABS sensor 104*a* mounted in the wheel 102. The second electric wires 6 are each constituted by coating a periphery of a respective second conductor 61 composed of highly conductive wires made of a copper or the like stranded together with a respective second insulating member 62 made of an insulating resin such as a cross-linked polyethylene or the like. As the wires to be used in the second conductors 61, similarly to the wires to be used in the first conductors 51, it is possible to use the wires having a diameter of e.g. 0.05 mm or more and 0.30 mm or less.

The outer diameters of the second electric wires 6 are smaller than the outer diameters of the first electric wires 5. Specifically, the second electric wires 6 have an outer diameter of e.g. 1.0 mm or greater and 1.8 mm or less.

Further, the second conductors 61 have an outer diameter of e.g. 0.4 mm or greater and 1.0 mm or less.

[Multi-Core Electric Wire 8]

The multi-core electric wire 8 is being configured by covering with the inner sheath 7 the periphery of the one pair (i.e., two) of second electric wires 6 brought in contact with each other and twisted together. The inner sheath 7 is made of, e.g., a urethane based resin such as a thermoplastic polyurethane or the like. Note that the outer diameter of the multi-core electric wire 8 is larger than the outer diameters of the first electric wires 5.

A twist pitch or lay length (hereinafter also referred to as "the first twist pitch or lay length") of the one pair of second electric wires 6 constituting the multi-core electric wire 8 may be configured in such a manner that no unnecessary load is applied to the second electric wires 6, in consideration of the outer diameters of the second electric wires 6. Here, the first twist pitch or lay length of the one pair of second electric wires 6 constituting the multi-core electric wire 8 is set at about 30 mm, but the first twist pitch or lay length of the one pair of second electric wires 6 constituting the multi-core electric wire 8 is not limited to this value. Note that the first twist pitch or lay length of the one pair of second electric wires 6 constituting the multi-core electric wire 8 refers to the distance between adjacent points in a longitudinal direction of the multi-core electric wire 8 where each second electric wire 6 constituting the multi-core electric wire 8 lies at the same positions in a circumferential direction of the multi-core electric wire 8.

[Aggregate 9]

The aggregate 9 refers to a bundle of electric wires constituted by laying the two first electric wires 5 and the one multi-core electric wire 8 together. In the present embodiment, the two first electric wires 5 and the one multi-core electric wire 8 are in contact with each other, and the two first electric wires 5 are also in contact with each other.

The outer diameter of the aggregate 9 is, e.g., on the order of 5 mm to 9 mm. The twist pitch or lay length (hereinafter also referred to as "the second twist pitch or lay length") of the two first electric wires 5 and the one multi-core electric wire 8 constituting the aggregate 9 may be configured in such a manner that no unnecessary load is applied to the two first electric wires 5 and the one multi-core electric wire 8, in consideration of the outer diameter of the aggregate 9. For example, the second twist pitch or lay length of the two first electric wires 5 and the one multi-core electric wire 8 constituting the aggregate 9 may be set at about 50 mm. Note that the second twist pitch or lay length of the two first electric wires 5 and the one multi-core electric wire 8 constituting the aggregate 9 refers to the distance between adjacent points in a longitudinal direction of the aggregate 9 where each electric wire (each first electric wire 5 or the one multi-core electric wire 8) constituting the aggregate 9 lies at the same positions in a circumferential direction of the aggregate 9.

[Tape Member 3]

The tape member 3 is being wrapped helically around the periphery of the aggregate 9. The tape member 3 is in contact with the two first electric wires 5 and the one multicore electric wire 8. The tape member 3 is being provided to prevent the outer sheath 4 from ingress into an aggregate 9 side of the cable 1, and acts to enhance the workability of the cable 1. The tape member 3 is made of e.g. a nonwoven fabric cloth.

The tape member 3 is being formed in such a manner as to include a material having a property of being easily adhered to an inner peripheral surface 4a of the outer sheath 4. For example, the tape member 3 comprises a mixture of a high melting point PET (polyethylene terephthalate) fiber and a low melting point PET (polyethylene terephthalate) fiber having a predetermined content percentage (a value smaller than 100%). The high melting point PET fiber is one example of a first fiber. The low melting point PET fiber is one example of a second fiber.

The melting point of the low melting point PET fiber is lower than the melting point of the high melting point PET fiber. Further, the melting point of the low melting point PET fiber is lower than an extrusion molding temperature of the outer sheath 4. Further, the melting point of the high melting point PET fiber is higher than the extrusion molding temperature of the outer sheath 4. Note that the extrusion molding temperature of the outer sheath 4 refers to a temperature at which the outer sheath 4 is provided over the periphery of the tape member 3 by coating molding by extrusion molding.

For example, when a PET having a melting point of about 250 degrees is used as the high melting point PET fiber and a urethane resin having an extrusion molding temperature of about 230 degrees is used as the outer sheath 4, it is preferable to use a PET fiber having a melting point of about 220 degrees as the low melting point PET fiber.

By including the low melting point PET fiber in the material for the tape member 3, when the outer sheath 4 is provided over the tape member 3 by coating molding by extrusion molding, the low melting point PET fiber included as a component of one part of the tape member 3 is softened or melted at the extrusion molding temperature during the extrusion molding and adhered to the inner peripheral surface 4a of the outer sheath 4. For this reason, the tape member 3 can be made integral with the outer sheath 4 without separately applying an adhesive to the tape member 3.

It should be noted, however, that if the percentage of the low melting point PET fiber content is set at 100%, in other words, if the entire tape member 3 with no high melting point PET fiber included therein is made of the low melting point PET fiber, the entire tape member 3 is softened or melted at the extrusion molding temperature during the coating formation of the outer sheath 4. For this reason, the adhesion between the tape member 3 and the outer sheath 4 becomes too strong, which may lead to an inconvenience such as a lowering in the flexibility of the cable 1 or the like. Therefore, as the tape member 3, the tape member with the high melting point PET fiber as well as the low melting point PET fiber being mixed therein is used. Note that, preferably, the percentage of the low melting point PET fiber content (the total weight of the low melting point PET fiber within the tape member 3/the weight of the tape member 3) is not lower than 10% by mass and not higher than 90% by mass. If the percentage of the low melting point PET fiber content is lower than 10% by mass, the tape member 3 may be difficult to adhere to the inner peripheral surface 4a of the outer sheath 4. Further, if the percentage of the low melting point PET fiber content is higher than 90% by mass, the flexibility of the cable 1 may be lowered. From the point of view of further suppressing the occurrence of these inconveniences, the percentage of the low melting point PET fiber content is more preferably not lower than 20% by mass and not higher than 80% by mass.

Further, the high melting point PET fiber and the low melting point PET fiber described above are preferably shorter in length. By making these fibers short in length, it is possible to suppress the occurrence of a fluffing during removing the tape member 3. The high melting point PET fiber and the low melting point PET fiber are preferably not longer than about 5 mm in length.

Note that the material for the low melting point fiber to be mixed in the tape member 3 is not necessarily limited to the low melting point PET fiber, but another material may be used as long as it can be softened or melted by the extrusion molding temperature, adhered to the material for the outer sheath 4 and made integral with the outer sheath 4. Further, the tape member 3 may not necessarily be wrapped helically around the aggregate 9, but may, for example be wrapped cylindrically around the aggregate 9. Note that, although in the present embodiment, the tape member 3 is being formed by mixing the two types of fibers having their melting points different from each other, the tape member 3 may be formed by mixing three or more types of fibers having their melting points different from each other.

[Outer Sheath 4]

The outer sheath 4 is being provided over the outer periphery of the tape member 3. As described above, the outer sheath 4 is provided over the tape member 3 at the predetermined extrusion molding temperature by coating molding such as the extrusion method or the like, for example. The outer sheath 4 is made of, e.g., a urethane resin such as a thermoplastic polyurethane or the like.

[Shield Layer]

Depending on the applications of the first electric wires 5 or the like, a shield layer (not shown) may be provided between the tape member 3 and the outer sheath 4 or over the outer periphery of the outer sheath 4. The shield layer is formed by braiding a conducting wire, for example.

[Filling Members]

In the spaces formed between the two first electric wires 5 and the one multi-core electric wire 8, a plurality of thread-like (fibrous) filling members (not shown) extending in the longitudinal direction of the cable 1 may be arranged, and those filling members may be laid together along with the two first electric wires 5 and the one multi-core electric wire 8, to thereby constitute the aggregate 9. By providing the plurality of the filling members, it is possible to make the cross-sectional shape of the cable 1 with the tape member 3 being wrapped around the outer periphery of the aggregate 9 closer to a circular shape. Note that the filling members may be further arranged in the valley surrounded by the two first electric wires 5 and the one multicore electric wire 8.

As the filling members, it is possible to use a fibrous material such as a polypropylene yarn, a staple fiber yarn (a rayon staple fiber), an aramid fiber, a nylon fiber, a fiber based plastic or the like, or a paper or a cotton yarn.

(Description of Harness Using Cable 1)

Figure 3:
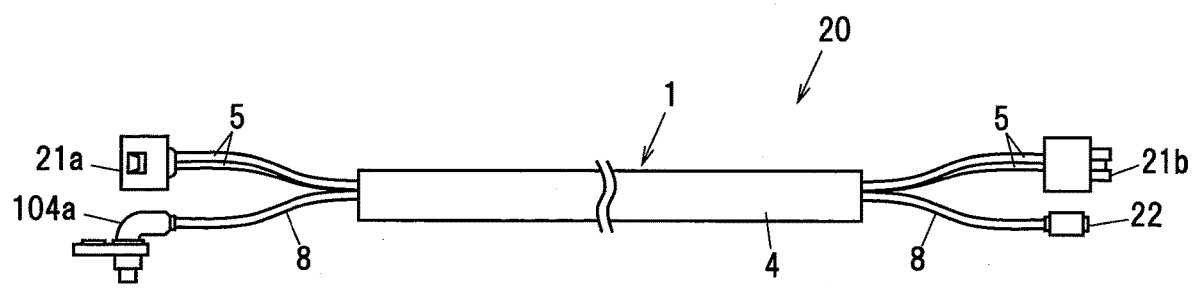
FIG. 3 is a schematic configuration diagram showing one example of a harness configuration according to one embodiment of the present invention.

FIG. 3 is a schematic configuration diagram of a harness according to the present embodiment. As shown in FIG. 3, the harness 20 is being configured to include the cable 1 according to the present embodiment, and a connector, which is attached to an end portion of at least any one of the two first electric wires 5 and the one multicore electric wire 8.

In FIG. 3, the left side in the figure shows the wheel 102 side end portion of the harness 20, while the right side in the figure shows the vehicle body 105 side (the relay box 106 side) end portion of the harness 20. In the following description, the wheel 102 side end portion of the harness 20 is referred to as "the one end portion", while the vehicle body 105 side (the relay box 106 side) end portion of the harness 20 is referred to as "the other end portion".

Of the two first electric wires 5 and the one multi-core electric wire 8, the one end portion of the two first electric wires 5 is being mounted with a wheel side power supply connector 21*a* for connection to the EPB electric motor 101*a*, while the other end portion of the one pair of first electric wires 5 is being mounted with a vehicle body side power supply connector 21*b* for connection to the electric wire group 107 within the relay box 106.

The one end portion of the one multi-core electric wire 8, specifically, the one end portion of the one pair of second electric wires 6 constituting the multi-core electric wire 8 is being mounted with the ABS sensor 104*a* formed by such a resin molding as to cover the inner sheath 7, while the other end portion of the one multi-core electric wire 8, specifically, the other end portion of the one pair of second electric wires 6 constituting the multi-core electric wire 8 is being mounted with a vehicle body side ABS connector 22 for connection to the electric wire group 107 within the relay box 106.

Note that, although herein is described the case where the connectors are provided separately for the first electric wires 5 and the multi-core electric wire 8 (i.e., the second electric wires 6), a dedicated connector for connecting the two first electric wires 5 and the one pair of second electric wires 6 together may be provided.

Actions and Advantageous Effects of the Embodiment

As described above, according to the embodiment of the present invention, by forming the tape member 3 by mixing the first fiber and the second fiber having a melting point lower than the melting point of the first fiber, it is possible to easily adhere the tape member 3 to the inner peripheral surface 4*a* of the outer sheath 4. As a result, when the outer sheath 4 is peeled in working (terminating) the end portion of the cable 1, the tape member 3 is easily peeled off together with the outer sheath 4, so it is possible to suppress the tape member 3 from remaining in the aggregate 9 side of the cable 1. This makes it possible to save the time required to remove the tape member 3 during the work (termination) of the end portion of the cable 1.

For example, if the tape member 3 is formed of only one type of PET fiber (e.g., high melting point PET fiber), the tape member 3 may be difficult to adhere to the outer sheath 4. For that reason, when the outer sheath 4 is peeled off in the work (termination) of the end portion of the cable 1, the tape member 3 may not be peeled off together with the outer sheath 4 but may remain in the aggregate 9 side of the cable 1, and it may be time consuming to remove this remaining tape member 3 from the aggregate 9. According to the present invention, during the work (termination) of the end portion of the cable 1, the tape member 3 is suppressed from remaining in the aggregate 9 side of the cable 1 as compared with the configuration as described above, so it is possible to save the time required to remove the tape member 3.

Although the embodiments of the present invention have been described above, the above described embodiments are not to be construed as limiting the inventions according to the claims. Further, it should be noted that not all the combinations of the features described in the embodiments are indispensable to the means for solving the problem of the invention.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A cable, comprising:
   a plurality of electric wires;
   a tape member being wrapped helically around a periphery of the plurality of electric wires; and
   an outer sheath provided over an outer periphery of the tape member,
   wherein the tape member comprises a mixture of a first fiber having a melting point and a second fiber having a melting point lower than the melting point of the first fiber,
   wherein a content of the second fiber in the tape member is not lower than 10% by mass and not higher than 90% by mass,
   wherein the second fiber, included as a component of one part of the tape member, comprises a material configured to be softened or melted at an extrusion molding temperature of the outer sheath and is adhered to an inner peripheral surface of the outer sheath,
   wherein the plurality of electric wires includes two first electric wires and a multi-core electric wire,
   wherein each of the two first electric wires comprises a first insulating member coating a periphery of a first conductor,
   wherein the multi-core electric wire comprises an inner sheath covering two second electric wires together, each of the two second electric wires having a diameter smaller than a diameter of each of the first electric wires and comprising a second insulating member coating a periphery of a second conductor, and
   wherein the two first electric wires and the multi-core electric wire are in contact with the tape member.

2. The cable according to claim 1, wherein the tape member is adhered to the inner peripheral surface of the outer sheath and made integral with the outer sheath.

3. The cable according to claim 1, wherein the melting point of the first fiber is higher than the extrusion molding temperature of the outer sheath, and the melting point of the second fiber is lower than the extrusion molding temperature of the outer sheath.

4. The cable according to claim 3, wherein the extrusion molding temperature of the outer sheath is 230 degrees, the melting point of the first fiber is 250 degrees, and the melting point of the second fiber is 220 degrees.

5. The cable according to claim 1, wherein the first fiber includes a high melting point polyethylene terephthalate (PET) fiber, and the second fiber includes a low melting point PET fiber having a melting point lower than a melting point of the high melting point PET fiber.

6. The cable according to claim 1, wherein the first fiber and the second fiber are not longer than 5 mm in length.

7. A harness, comprising:
   the cable according to claim 1; and
   a connector attached to an end portion of the plurality of electric wires.

8. The cable according to claim 1, wherein the inner sheath collectively covers an entirety of the two second electric wires.

9. The cable according to claim 8, wherein the inner sheath is disposed on an inner surface of the tape member.

10. The cable according to claim 9, wherein the inner sheath contacts outer surfaces of the two first electric wires.

11. The cable according to claim 9, wherein the inner sheath abuts an outer surface of each of the two first electric wires.

12. The cable according to claim 1, wherein an outer diameter of second conductor is less than an outer diameter of the first conductor.

13. The cable according to claim 1, wherein the inner sheath collectively covers an entirety of outer surfaces of the two second electric wires.

14. The cable according to claim 1, wherein the tape member is an integral part of the outer sheath such that the tape member is adhered to the outer sheath without an adhesive.

15. The cable according to claim 1, wherein the content of the second fiber in the tape member is in a range from 20% by mass to 80% by mass.

16. The cable according to claim 1, wherein the outer sheath comprises a thermoplastic polyurethane.

17. The cable according to claim 1, wherein the melting point of the first fiber is higher than the extrusion molding temperature of the outer sheath.

18. The cable according to claim 1, wherein the melting point of the second fiber is lower than the extrusion molding temperature of the outer sheath.

19. The cable according to claim 1, wherein the inner sheath abuts an inner surface of the tape member.

20. The cable according to claim 1, wherein an outer surface of the inner sheath contacts an inner surface of the tape member.

* * * * *